US012631723B2

(12) United States Patent
Li et al.

(10) Patent No.: US 12,631,723 B2
(45) Date of Patent: May 19, 2026

(54) METHOD AND DEVICE FOR DIRECTION OF ARRIVAL ESTIMATION BASED ON ONE-BIT QUANTIZATION ANTENNA ARRAY

(71) Applicant: SHENZHEN UNIVERSITY, Shenzhen (CN)

(72) Inventors: Xiaopeng Li, Shenzhen (CN); Lei Huang, Shenzhen (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 245 days.

(21) Appl. No.: 18/426,748

(22) Filed: Jan. 30, 2024

(65) Prior Publication Data

US 2024/0410975 A1     Dec. 12, 2024

(30) Foreign Application Priority Data

Jun. 8, 2023     (CN) ......................... 202310672449.1

(51) Int. Cl.
*G01S 7/03* (2006.01)
*G01S 13/06* (2006.01)

(52) U.S. Cl.
CPC ............... *G01S 7/03* (2013.01); *G01S 13/06* (2013.01)

(58) Field of Classification Search
CPC ................................... G01S 7/03; G01S 13/06
See application file for complete search history.

(56) References Cited

U.S. PATENT DOCUMENTS

2024/0077598 A1 * 3/2024 Delude ............... G01S 15/8954
2025/0293730 A1 * 9/2025 Eldar .................. H04B 1/0028

FOREIGN PATENT DOCUMENTS

CN       112104579 A     12/2020
CN       112242969 A     1/2021
(Continued)

OTHER PUBLICATIONS

Y. Li, C. Tao, G. Seco-Granados, A. Mezghani, A. L. Swindlehurst and L. Liu, "Channel Estimation and Performance Analysis of One-Bit Massive MIMO Systems," in IEEE Transactions on Signal Processing, vol. 65, No. 15, pp. 4075-4089, 1 Aug. 1, 2017, doi: 10.1109/TSP.2017.2706179. (Year: 2017).*
(Continued)

*Primary Examiner* — Vladimir Magloire
*Assistant Examiner* — Nazra Nur Waheed
(74) *Attorney, Agent, or Firm* — Maier & Maier, PLLC

(57)     ABSTRACT

A method and a device for direction of arrival estimation based on one-bit quantization antenna array, the method including: designing a received signal model of robust one-bit radar, designing an optimal objective function of the robust one-bit radar, replacing a first function in the optimal objective function with a second objective function to obtain a new optimal objective function, and according to the new optimal objective function, adopting a proximal alternating minimization method and a gradient descent method to solve the optimization problem and obtain an incident angle of a target echo signal. The embodiments reshape the received signal model of the one-bit radar, enabling the received signals to preserve or reflect the distribution information of noise data. The embodiments utilize a specific norm to describe the distribution of noise, effectively suppressing quantization error bits generated by low signal-to-noise ratio when estimating DoA with one-bit algorithm.

9 Claims, 3 Drawing Sheets

(56) References Cited

FOREIGN PATENT DOCUMENTS

| CN | 112910807 A | 6/2021 |
| CN | 113037342 A | 6/2021 |

OTHER PUBLICATIONS

Xia et al., "A Fast Gridless DOA Estimation Algorithm for Low-bit Quantized Array"; Modern Radar; Aug. 2022; vol. 44, No. 8; 6 pages; English-language Abstract included.
Liu et al., "Two-Dimensional Localization: Low-Rank Matrix Completion With Random Sampling in Massive MIMO System"; IEEE Systems Journal; 2020; 4 pages.
Ning et al., "Velocity-independent and low-complexity method for 1D DOA estimation using an arbitrary cross-linear array"; EURASIP Journal on Advances in Signal Processing; 2020; 9 pages.

* cited by examiner

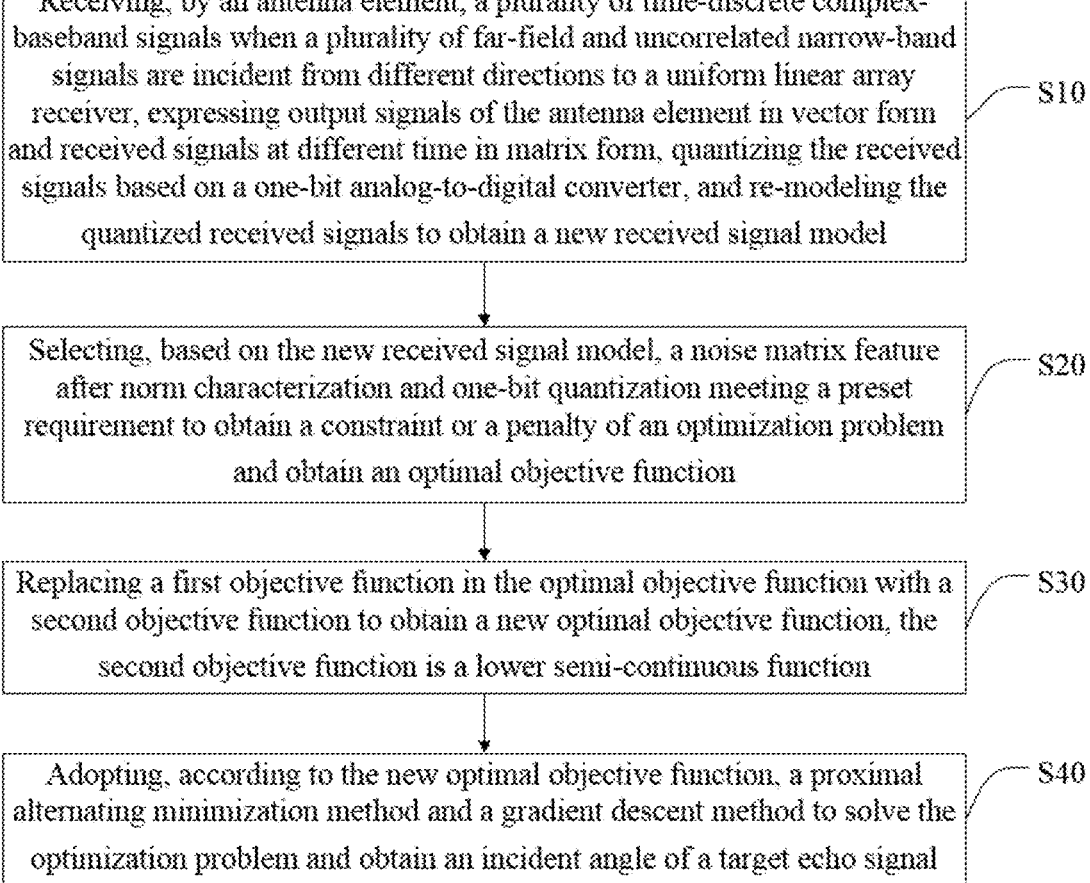

Receiving, by an antenna element, a plurality of time-discrete complex-baseband signals when a plurality of far-field and uncorrelated narrow-band signals are incident from different directions to a uniform linear array receiver, expressing output signals of the antenna element in vector form and received signals at different time in matrix form, quantizing the received signals based on a one-bit analog-to-digital converter, and re-modeling the quantized received signals to obtain a new received signal model    S10

Selecting, based on the new received signal model, a noise matrix feature after norm characterization and one-bit quantization meeting a preset requirement to obtain a constraint or a penalty of an optimization problem and obtain an optimal objective function    S20

Replacing a first objective function in the optimal objective function with a second objective function to obtain a new optimal objective function, the second objective function is a lower semi-continuous function    S30

Adopting, according to the new optimal objective function, a proximal alternating minimization method and a gradient descent method to solve the optimization problem and obtain an incident angle of a target echo signal    S40

Fig. 1

METHOD AND DEVICE FOR DIRECTION OF ARRIVAL ESTIMATION BASED ON ONE-BIT QUANTIZATION ANTENNA ARRAY

CROSS-REFERENCES TO RELATED APPLICATIONS

This application claims priority to Chinese Patent Application No. 202310672449.1, filed on Jun. 8, 2023, the content of all of which is incorporated herein by reference.

TECHNICAL FIELD

The present disclosure is related to the field of electronic information technology, in particular to a method and a device for direction of arrival (DoA) estimation based on one-bit quantization antenna array.

BACKGROUND

As the increasing scale of radar system and receiver bandwidth, massive data generated by high-precision and high-speed sampling imposes significant storage, transmission, and processing pressures on digital radar, becoming a major limiting factor. Simultaneously, as radar systems move towards miniaturized platforms like unmanned aerial vehicles, microsatellites, and smart vehicles, the constraints on system resources become more stringent. Enhancing the efficiency of system resource utilization has become a current research focus in the field of radar.

One-bit compressed sampling significantly simplifies the process of Analog-to-Digital Conversion (ADC), which retains only the sign information of each measurement value. This not only alleviates the pressure on high-speed ADC but also reduces the overall data amount, further easing the burden of data storage and processing. On the hardware side, a one-bit ADC (i.e., a one-bit analog-to-digital converter) can be simplified to a comparator, enabling faster data acquisition and lower power consumption. This advantage is evident and can effectively simplify systems, reduce costs, and enhance efficiency. One-bit radar is a novel radar system that utilizes one-bit ADC for data acquisition, which achieves functions similar to traditional radar while reducing the size, cost, and energy consumption of the radar system. This approach offers significant advantages in overcoming system resource limitations.

Direction-of-Arrival (DoA) estimation is a commonly used technique in radar systems. One-bit DoA estimation efficiently obtains angle information of signal sources by utilizing only sign bits of array signals. Due to the relatively low requirements on data acquisition and storage system, this technology has garnered widespread attention in radar and communication fields. Current methods for one-bit DoA estimation include covariance matrix reconstruction-based beamforming, one-bit Multiple Signal Classification (MUSIC), Complex Binary Iterative Hard Thresholding (CBIHT), Fixed-Point Continuation (FPC) algorithm, FPC-based deep learning, support vector machines, one-bit joint sparse representation, iterative rank minimization, as well as methods generalized approximate message passing specific to sparse linear arrays like MUSIC, and L-shaped arrays, and generalized sparse Bayesian Learning algorithms.

However, these methods perform well when there are fewer quantization error bits (e.g., −5 should be −1 after one-bit quantization; if it is 1, it is considered as one quantization error bit, and the total number of quantization errors in a signal is referred to as a quantization error bit number). Yet, as the quantization error bit number increases, the estimation performance severely deteriorates (This is because the loss functions of current algorithms cannot suppress the noise introduced by quantization error bits since these loss functions do not analyze the distribution of noise after quantization). In practical applications, radar signal-to-noise ratio is often low, for example, −20 dB, leading to a larger quantization error bit number. Therefore, to ensure the robustness of one-bit DoA estimation, considerations must be made for low signal-to-noise ratio scenario.

The current problem is that models based on one-bit DoA estimation cannot accurately describe the noise distribution. Although the noise is additive, the noise distribution is obscured in the observed signal due to the effect of the one-bit quantization operation. Therefore, existing observation models are unable to handle data in strong noise environments.

Therefore, the present technology needs to be developed and improved.

SUMMARY

The main purpose of the present disclosure is to provide a method, a system, a terminal and a computer-readable storage medium for DoA estimation based on one-bit quantization antenna array, aiming to solve the problem that the model based on one-bit DoA estimation in the present technology cannot accurately describe the noise distribution, thus unable to effectively suppress erroneous quantization caused by low signal-to-noise ratio.

To achieve above-mentioned purpose, the present disclosure provides a method for DoA estimation based on one-bit quantization antenna array. The method includes steps of:

Receiving, by an antenna element, a plurality of time-discrete complex-baseband signals when a plurality of far-field and uncorrelated narrow-band signals are incident from different directions to a uniform linear array receiver, expressing output signals of the antenna element in vector form and received signals at different time in matrix form, quantizing the received signals based on a one-bit analog-to-digital converter, and re-modeling the quantized received signals to obtain a new received signal model;

Selecting, based on the new received signal model, a noise matrix feature after norm characterization and one-bit quantization meeting a preset requirement to obtain a constraint or a penalty of an optimization problem and obtain an optimal objective function;

Replacing a first objective function in the optimal objective function with a second objective function to obtain a new optimal objective function, the second objective function is a lower semi-continuous function;

Adopting, according to the new optimal objective function, a proximal alternating minimization method and a gradient descent method to solve the optimization problem and obtain an incident angle of a target echo signal.

Optionally, in the method for DoA estimation based on one-bit quantization antenna array, the uniform linear array receiver is composed of M antenna elements, a distance between the antenna elements is d, and $d \leq \lambda/2$, wherein $\lambda$ is a wavelength of an incident signal.

Optionally, in the method for DoA estimation based on one-bit quantization antenna array, the receiving, by an antenna element, a plurality of time-discrete complex-baseband signals when a plurality of far-field and uncorrelated narrow-band signals are incident from different directions to a uniform linear array receiver, expressing output signals of the antenna element in vector form and received signals at different time in matrix form, quantizing the received signals based on a one-bit analog-to-digital convertor, and re-modeling the quantized received signals to obtain a new received signal model includes:

Representing, when $\tilde{Q}$ far-field and uncorrelated narrow-band signals are incident from different directions $\tilde{\theta}=\{\theta_1, \theta_2, \ldots, \theta_{\tilde{Q}}\}$ to the uniform linear array receiver, a time-discrete complex-baseband signal received at the n-th moment, by the m-th antenna element as $$y_m(n) = \sum_{q=1}^{\tilde{Q}} s_q(n) e^{j2\pi(m-1)\sin(\theta_q)d/\lambda} + e_m(n), \tag{1}$$

Wherein $y_m(n)$ represents the time-discrete complex-baseband signal received at the n-th moment, by the m-th antenna element, $S_q(n)$ represents the q-th signal source, $j=\sqrt{-1}$ represents imaginary unit, $e_m(n)$ represents an additive noise, and $\theta_q$ represents a DoA angle of a real signal;

Expressing the output signal of M antenna elements at the n-th moment as a vector:

$$y_n = A(\tilde{\theta})s_n + e_n, \tag{2}$$

Wherein $y_n=[y_1(n), \ldots, y_M(n)]^H \in \mathbb{C}^M$ represents a received signal vector of length M; H represents Hermitian conjugate transpose, $\mathbb{C}$ represents complex domain;

$s_n=[s_1(n), \ldots, s_{\tilde{Q}}(n)]^H \in \mathbb{C}^{\tilde{Q}}$ represents a signal source vector of length $\tilde{Q}$; $s_{\tilde{Q}}(n)$ represents the $\tilde{Q}$-th signal source;

$e_n=[e_1(n), \ldots, e_M(n)]^H \in \mathbb{C}^M$ represents a noise vector of length M; $e_M(n)$ represents the additive noise;

$A(\tilde{\theta})$ is an array manifold matrix, expressed as:

$$A(\tilde{\theta}) = [a(\theta_1); \ldots ; a(\theta_{\tilde{Q}})], \tag{3}$$

Wherein $\theta_q$ represents the DoA angle of the real signal, $a(\theta_q)$ is a steering vector of array, expressed as:

$$a(\theta_q) = [1, e^{j2\pi\sin(\theta_q)d/\lambda}, \ldots, e^{j2\pi(M-1)\sin(\theta_q)d/\lambda}]^H, \tag{4}$$

Expressing the received signals in matrix form when snapshot number is N:

$$\tilde{Y} = A(\tilde{\theta})\tilde{S} + E, \tag{5}$$

Wherein $\tilde{Y} \in \mathbb{C}^{M \times N}$ is a receiving matrix signal with dimension M×N, $\tilde{S}=[s_1, \ldots, s_N] \in \mathbb{C}^{\tilde{Q} \times N}$ is a matrix with dimension $\tilde{Q} \times N$, $E=[e_1, \ldots, e_N] \in \mathbb{C}^{M \times N}$ is a matrix with dimension M×N, E represents a noise matrix;

Expressing a quantized signal of the one-bit analog-to-digital converter as:

$$Y = c\text{sgn}(A(\tilde{\theta})\tilde{S} + E), \tag{6}$$

Wherein $c\text{sgn}(\bullet)=c\text{sgn}(\Re(\bullet))+jc\text{sgn}(\Im(\bullet))$, $\Re(\bullet)$ represents a real part of a complex number, $\Im(\bullet)$ represents an imaginary part of the complex number, $c\text{sgn}(\ )$ represents one-bit quantization function sign(of the complex number;

When $\theta=\{\theta_1, \theta_2, \ldots, \theta_Q\}$ is a complete vector, $\theta>>\tilde{\theta}$, wherein Q elements are uniformly sampled values from $$-\frac{\pi}{2} \text{ to } \frac{\pi}{2},$$

defining a signal matrix based on $\theta$ as: $S=\mathbb{C}^{Q \times N}$;

Replacing the $\tilde{\theta}$ and $\tilde{S}$ in equation (6) with $\theta$ and S, respectively, to obtain equation as:

$$Y = c\text{sgn}(A(\theta)S + E), \tag{7}$$

Wherein S is a row sparse matrix having a sparsity of $\tilde{Q}$;

Remodeling the quantized signal of the equation (7) to obtain the new received signal model:

$$Y = c\text{sgn}(A(\theta)S) + N, \tag{8}$$

Wherein N is a quantized noise matrix having element value selected from $n_{i,j} \in \{-2, 0, 2\}+j\{-2, 0, 2\}$.

Optionally, in the method for DoA estimation based on one-bit quantization antenna array, the selecting, based on the new received signal model, a noise matrix feature after norm characterization and one-bit quantization meeting a preset requirement to obtain a constraint or a penalty of an optimization problem, and obtain an optimal objective function includes:

Applying $\ell_0$-norm constraint to N to ensure sparse characteristics, applying $\ell_{2,0}$-norm constraint to S to ensure sparse characteristics, and expressing the optimal objective function as:

$$\min_{S,N}\|Y - c\text{sgn}(A(\theta)S)\|_F^2, \text{ s.t. } \|S\|_{2,0} \leq \tilde{Q}, \|N\|_0 \leq \rho, \tag{9}$$

Wherein $\tilde{Q}$ and $\rho$ are a target number and a quantization error bit number, respectively;

Transforming the optimization problem of the equation (9) into an optimization problem with penalty term, and obtain the optimal objective function:

$$\min_{S,N}\|Y - c\text{sgn}(A(\theta)S) - N\|_F^2 + \gamma\|N\|_0, \text{ s.t. } \|S\|_{2,0} \leq \tilde{Q}, \tag{10}$$

Wherein $\gamma>0$ and represents penalty parameter used to control a sparsity of N.

Optionally, in the method for DoA estimation based on one-bit quantization antenna array, the first objective function is a sign( ) function, and the second objective function is a tanh( ) function;

The replacing a first objective function in the optimal objective function with a second objective function to obtain a new optimal objective function, the second objective function is a lower semi-continuous function includes:

Replacing the sign( ) function in the optimal objective function with the tanh( ) function, and transforming the optimization problem of the equation (10) into:

$$\min_{S,n}\|Y - \tanh(c*A(\theta)S) - N\|_F^2 + \gamma\|\|\|_0, \text{ s.t. } \|S\|_{2,0} \leq \tilde{Q}, \quad (11)$$

Wherein c is a constant used to control an approximation degree between the tanh( ) function and the sign( ) function, and c>0.

Optionally, in the method for DoA estimation based on one-bit quantization antenna array, the adopting, according to the new optimal objective function, a proximal alternating minimization method and a gradient decent method to solve the optimization problem and obtain an incident angle of a target echo signal includes:

Selecting the proximal alternating minimization method to solve the optimization problem, wherein the proximal alternating minimization method comprises:

$$S^{k+1} = \arg\min_{S,\|S\|_{2,0}\leq S} f(S, N^k) \quad (12)$$
$$= \arg\min_{S,\|S\|_{2,0}\leq S}\|Y - \tanh(c*A(\theta)S) - N^k\|_2^2 + \mu\|S - S^k\|_2^2,$$

$$N^{k+1} = \arg\min\ f(S^{k+1}, N) \quad (13)$$
$$= \arg\min_{N}\|Y - \tanh(c*A(\theta)S^{k+1}) - N\|_2^2 + \gamma\|N\|_0 + \mu\|N - N^k\|_2^2,$$

Wherein k represents an iteration number in proximal alternating minimization, $\mu>0$ and is a predefined proximal parameter;

Selecting a projected gradient descent method to process equation (12), wherein comprises iteration steps of:

$$Z_p = S_p^k - \eta \nabla f(S_p^k, N^k), \quad (14)$$

$$z = [\|(Z_p)_{1,:},\ \dots,\ (Z_p)_{N,:}\|_2], \quad (15)$$

$$(S_p^{k+1})_{i,:} = \begin{cases} (Z_p)_{i,:}, & \text{if } i \in \vartheta, \\ 0, & \text{if } i \notin \vartheta, \end{cases} \quad (16)$$

Wherein $Z_p$ is a value of $$S_p^k$$

after gradient descent once, p represents an iteration number of projected gradient descent, $\eta$ is a step size in gradient descent solving process, $Z_{i,:}$ is the i-th row of matrix Z; $\upsilon$ contains coordinates of top $\tilde{Q}$ maximum value in z;

$$\nabla f(S_p^k, N^k)$$

is a gradient of $f(S, N^k)$ on $$S_p^k$$

with respect to S:

$$\nabla f(S, N^k) = \quad (17)$$
$$-2c*A^H\big(\big((Y - N^k)^H - \tanh(c*A(\theta)S)\big) \odot \big(1 - \tanh(c*A(\theta)S)^2\big)\big) +$$
$$2\mu(S - S_p^k),$$

Wherein $\odot$ represents multiplication of elements;

For optimization problem of the equation (13), converting the complex form into real form:

$$\hat{N}^{k+1} = \arg\min_{\hat{N}}\left\|\hat{Y} - \tanh\big(x*\hat{A}(\theta)\hat{S}^{k+1}\big) - \hat{N}\right\|_2^2 + \gamma\|\hat{N}\|_0 + \mu\left\|\hat{N} - \hat{N}^k\right\|_2^2, \quad (18)$$

Wherein $\hat{Y}=[\Re(Y); \Im(Y)]$, $\hat{S}^{k+1}=[\Re(S)^{k+1}; \Im(S)^{k+1}]$, $\hat{N}=[\Re(N); \Im(N)]$, and $\hat{A}(\theta)=[\Re(A(\theta)), -\Im(A(\theta)); \Im(A(\theta)); \Re(A(\theta))]$;

Defining $\hat{E}^k=\hat{Y}-\tanh(c*\hat{A}(\theta)\hat{S}^{k+1})$, then:

$$\hat{N}^{k+1} = \arg\min_{\hat{N}}\left\|\hat{E}^k - \hat{N}\right\|_F^2 + \gamma\|\hat{N}\|_0 + \mu\left\|\hat{N} - \hat{N}^k\right\|_F^2, \quad (19)$$

In the equation (19), $\hat{N}_{i,j}$ relies only on values of $$\hat{E}_{i,j}^k \text{ and } \hat{N}_{i,j}^k,$$

and solving the optimization problem of the equation (19) element-by-element:

$$\hat{N}_{i,j}^{k+1} = \begin{cases} \dfrac{\hat{E}_{i,j}^k + \mu\hat{N}_{i,j}^k}{1+\mu}, & \gamma \leq (\hat{E}_{i,j}^k)^2 + \mu(\hat{N}_{i,j}^k)^2 - \dfrac{\mu\big(\hat{N}_{i,j}^k - \hat{E}_{i,j}^k\big)^2}{1+\mu} \\ 0, & \gamma > (\hat{E}_{i,j}^k)^2 + \mu(\hat{N}_{i,j}^k)^2 - \dfrac{\mu\big(\hat{N}_{i,j}^k - \hat{E}_{i,j}^k\big)^2}{1+\mu} \end{cases}, \quad (20)$$

Obtaining a plural form $$N^{k+1} = \hat{N}_{1:M,:}^{k+1} + j\hat{N}_{M+1:2M:}^{k+1}$$

after obtaining $\hat{N}^{k+1}$;

Obtaining the incident angle of the target echo signal based on recovered S after iteration.

Optionally, in the method for DoA estimation based on one-bit quantization antenna array, the antenna element is a sensor.

In addition, to achieve the above-mentioned purpose, the present disclosure further provides a system for DoA estimation based on one-bit quantization antenna array. The system for DoA estimation based on one-bit quantization antenna array includes:

A signal model reconstructing module, configured to receive, by an antenna element, a plurality of time-discrete complex-baseband signals when a plurality of far-field and uncorrelated narrow-band signals are incident from different directions to a uniform linear array receiver, express output signals of the antenna element in vector form and received signals at different time in matrix form, quantize the received signals based on a one-bit analog-to-digital converter, and re-model the quantized received signals to obtain a new received signal model;

An objective function designing module, configure to select, based on the new received signal model, a noise matrix feature after norm characterization and one-bit quantization meeting a preset requirement to obtain a constraint or a penalty of an optimization problem and obtain an optimal objective function;

An objective function optimizing module, configured to replace a first objective function in the optimal objective function with a second objective function to obtain a new optimal objective function, the second objective function is a lower semi-continuous function; and An optimization problem solving module, configured to adopt, according to the new optimal objective function, a proximal alternating minimization method and a gradient descent method to solve the optimization problem and obtain an incident angle of a target echo signal.

In addition, to achieve the above-mentioned purpose, the present disclosure further provides a terminal. The terminal includes: a memory, a processor, and a DoA estimation program based on one-bit quantization antenna array stored in the memory and implemented by the processor, when the program is executed by the processor, steps of the DoA estimation method based on one-bit quantization antenna array as mentioned above are implemented.

In addition, to achieve the above-mentioned purpose, the present disclosure further provides a computer-readable storage medium. The computer-readable storage medium stores a DoA estimation program based on one-bit quantization antenna array, when the program is executed by a processor, steps of the DoA estimation method based on one-bit quantization antenna array mentioned above are implemented.

In the present disclosure, when a plurality of far-field and uncorrelated narrow-band signals are incident from different directions to a uniform linear array receiver, an antenna element receives a plurality of time-discrete complex-baseband signals and express output signals of the antenna element in vector form and received signals at different time in matrix form. The received signals are quantized based on a one-bit analog-to-digital converter and re-modeled to obtain a new received signal model. Based on the new received signal model, a noise matrix feature after norm characterization and one-bit quantization meeting a preset requirement is selected to obtain a constraint or a penalty of an optimization problem and obtain an optimal objective function. A first objective function in the optimal objective function is replaced by a second objective function to obtain a new optimal objective function, and the second objective function is a lower semi-continuous function. According to the new optimal objective function, a proximal alternating minimization method and a gradient descent method are adopted to solve the optimization problem and obtain an incident angle of a target echo signal. The purpose of the present disclosure is to reshape the received signal model of the one-bit radar, enabling the received signals to preserve or reflect the distribution information of noise data. The present disclosure utilizes a specific norm to describe the distribution of noise, effectively suppressing quantization error bits generated by low signal-to-noise ratio when estimating DoA with one-bit algorithm, enabling the robustness of one-bit DoA estimation and further improving the accuracy of one-bit quantization DoA estimation in low signal-to-noise ratio scenario.

8

BRIEF DESCRIPTION OF THE DRAWINGS

FIG. 1 is a flow chart of an embodiment of a method for DoA estimation based on one-bit quantization antenna array according to the present disclosure;

DETAILED DESCRIPTION OF THE EMBODIMENTS

Figure 2:
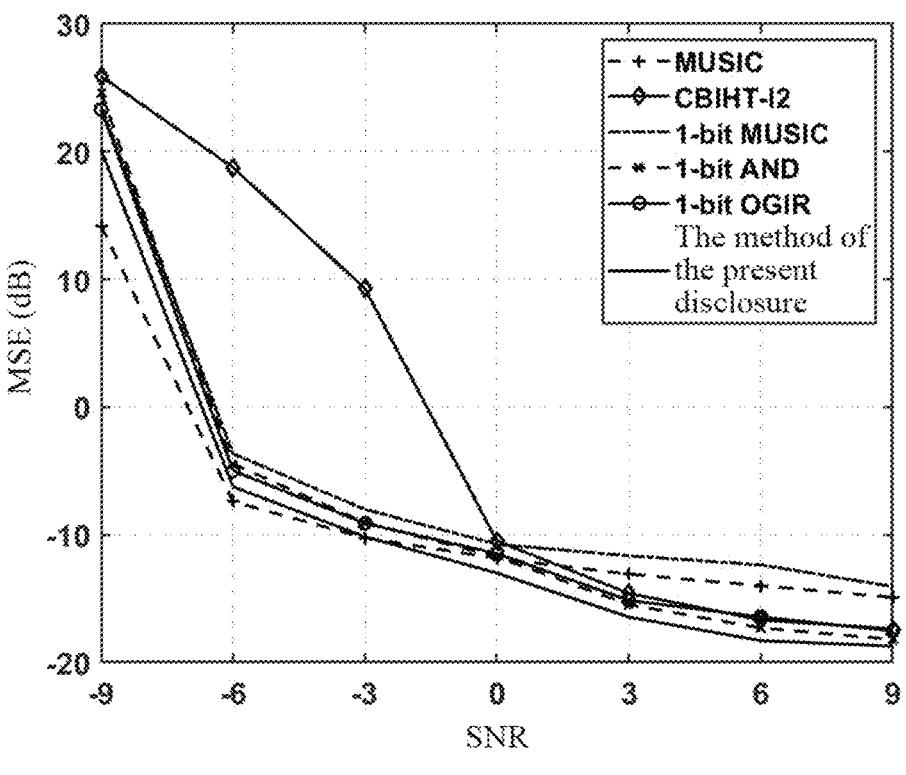
FIG. 2 is a schematic diagram showing the mean square error between an estimated angle and an actual angle under different signal-to-noise ratio conditions in an embodiment of a method for DoA estimation based on one-bit quantization antenna array according to the present disclosure.

In order to make the purpose, technical solutions, and advantages of the present disclosure clearer, the present disclosure is further described in detail below with reference to the accompanying drawings and embodiments. It should be understood that the embodiments described here are only used to explain the present disclosure and are not intended to limit the present disclosure.

An embodiment of the present disclosure provides a method for direction of arrival (DoA) estimation based on one-bit quantization antenna array. As shown in FIG. 1, the method for DoA estimation based on one-bit quantization antenna array includes the following steps:

Step S10. Receiving, by an antenna element, a plurality of time-discrete complex-baseband signals when a plurality of far-field and uncorrelated narrow-band signals are incident from different directions to a uniform linear array receiver, expressing output signals of the antenna element in vector form and received signals at different time in matrix form, quantizing the received signals based on a one-bit analog-to-digital converter, and re-modeling the quantized received signals to obtain a new received signal model.

The uniform linear array receiver is composed of M antenna elements (for example, the antenna elements are sensors). The distance between the antenna elements is d, in order to avoid phase ambiguity, the distance needs to satisfy $d \leq \lambda/2$, and $\lambda$ is a wavelength of an incident signal.

Assuming $\tilde{Q}$ far-field and uncorrelated narrow-band signals are incident from different directions $\tilde{\theta}=\{\theta_1, \theta_2, \ldots, \theta_{\tilde{Q}}\}$ to the uniform linear array receiver, a time-discrete complex-baseband signal received at moment n, by mth antenna element can be modeled as:

$$y_m(n) = \sum_{q=1}^{\tilde{Q}} s_q(n)e^{j2\pi(m-1)sin(\theta_q)d/\lambda} + e_m(n), \quad (1)$$

wherein $y_m(n)$ represents the time-discrete complex-baseband signal (i.e., the received signal of the antenna element) received at moment n, by mth antenna element, $S_q(n)$ represents the q-th signal source (i.e., a narrow-band signal), j=$\sqrt{-1}$ represents imaginary unit, $e_m(n)$ represents an additive noise which could be a white Gaussian noise or a non-Gaussian noise, and $\theta_q$ represents a DoA angle of a real signal (i.e., an incident angle of the q-th target).

Expressing the output signal of M antenna elements at a moment n as a vector:

$$y_n = A(\tilde{\theta})s_n + e_n, \qquad (2)$$

wherein $y_n=[y_1(n), \ldots, y_M(n)]^H \in \mathbb{C}^M$ represents a received signal vector of length M; H represents Hermitian conjugate transpose, $\mathbb{C}$ represents complex domain, and the M on the right upper corner of $\mathbb{C}$ represents the dimension of an element.

$s_n=[s_1(n), \ldots, s_Q(n)]^H \in \mathbb{C}^{\tilde{Q}}$ represents a signal source vector of length Q; $s_Q(n)$ represents the $\tilde{Q}$th signal source; $e_n=[e_1(n), \ldots, e_M(n)]^H \in \mathbb{C}^M$ represents a noise vector of length M; $e_M(n)$ represents the additive noise;

$A(\tilde{\theta})$ is an array manifold matrix, expressed as:

$$A(\tilde{\theta}) = [a(\theta_1), \cdots, a(\theta_{\tilde{Q}})], \qquad (3)$$

wherein $\theta_q$ represents the DoA angle of the real signal, $a(\theta_q)$ is a steering vector of an array, expressed as:

$$a(\theta_q) = \left[1, e^{j2\pi \sin(\theta_q)d/\lambda}, \cdots, e^{j2\pi(M-1)\sin(\theta_q)d/\lambda}\right]^H, \qquad (4)$$

Expressing the received signals in matrix form when the snapshot number is N (one moment is one snapshot, the snapshot number N represents the data received in N moments):

$$\tilde{Y} = A(\tilde{\theta})\tilde{S} + E, \qquad (5)$$

wherein $\tilde{Y} \in \mathbb{C}^{M \times N}$ (M×N on the right upper corner of $\mathbb{C}$ represents the dimension of an element, and M×N stands for a matrix having M rows and N columns), $\tilde{S}=[s_1, \ldots, s_N] \in \mathbb{C}^{Q \times N}$, $E=[e_1, \ldots, e_N] \in \mathbb{C}^{M \times N}$, E represents a noise matrix.

Expressing a quantized signal of the one-bit analog-to-digital converter as:

$$Y = c\text{sgn}(A(\tilde{\theta})\tilde{S} + E), \qquad (6)$$

wherein csgn(•)=csgn($\Re$(•))+jcsgn($\Im$(•)), which represents a sign function. $\Re$(•) represents a real part of complex number, $\Im$(•) represents an imaginary part of complex number, csgn( ) represents one-bit quantization function sign( ) in complex domain, sgn represents the operation to real number and csgn represents the operation to complex number here, j is the imaginary unit.

The problem of robust one-bit DoA estimation is to solve the angle $\theta_q$ of each target in quantized Y.

Assuming $\theta=\{\theta_1, \theta_2, \ldots, \theta_Q\}$ is a complete vector, $0>>\tilde{\theta}$, wherein Q elements are uniformly sampled values from $$-\frac{\pi}{2} \text{ to } \frac{\pi}{2},$$

defining a signal matrix based on $\theta$ as: $S=\mathbb{C}^{Q \times N}$;

Replacing the $\tilde{\theta}$ and $\tilde{S}$ in equation (6) with $\theta$ and S, respectively, to obtain equation as:

$$Y = c\text{sgn}(A(\theta)S + E), \qquad (7)$$

Theoretically, all non-zero rows in S are sequentially corresponded to rows in $\tilde{S}$, and other rows are all zero. Thus, S is a row sparse matrix having a sparsity of $\tilde{Q}$. If the non-zero rows in S can be estimated accurately, $\theta$ can be simply approximated.

The present methods all estimated S according to the signal model of the equation (7). The operation of one-bit quantization destroys the distribution of the noise matrix E. Therefore, present observing models show significant reduced performance when dealing with the data in strong noise environment.

Remodeling the quantized signal of the equation (7) to obtain the new received signal model:

$$Y = c\text{sgn}(A(\theta)S) + N, \qquad (8)$$

wherein N is a quantized noise matrix having element value selected from $n_{i,j} \in \{-2, 0, 2\}+j\{-2, 0, 2\}$, the values are theoretically falling in this range. For example, correct quantization y=1+j1. When quantization error occurs, y=−1−j1. Thus, n=−2−j2. According to the equation (8), N satisfies sparse characteristics and can be constrained by $\ell_0$-norm.

Step S20. Selecting, based on the new received signal model, a noise matrix feature after norm characterization and one-bit quantization meeting a preset requirement to obtain a constraint or a penalty of an optimization problem and obtain an optimal objective function.

N is already constrained by $\ell_0$-norm and satisfies sparse characteristics. Because the target variable S is row sparse, $\ell_{2,0}$-norm constraint is applied to S.

Furthermore, the noise matrix N is known to be sparse, so $\ell_0$-norm constraint is applied to N. Based on the above two constraints, the optimal objective function is expressed as:

$$\min_{S,N} \|Y - c\text{sgn}(A(\theta)S)\|_F^2, \text{ s.t. } \|S\|_{2,0} \le \tilde{Q}, \|N\|_0 \le \rho, \qquad (9)$$

Wherein $\tilde{Q}$ and $\rho$ are the target number and the quantization error bit number, respectively. $\|S\|_{2,0}$ represents the $\ell_{2,0}$-norm, i.e., calculating $\ell_2$-norm of each row of S to obtain a vector and choosing $\ell_0$-norm for the vector. $\|N\|_0$ represents $\ell_0$-norm, i.e., the number of non-zero elements in N.

In the present disclosure, $\tilde{Q}$ is assumed to be known, since $\rho$ is hard to estimate in real application, the optimization problem (9) is transformed into an optimization problem with penalty term, to obtain the optimal objective function:

$$\min_{S,N} \|Y - \text{sgn}(A(\theta)S) - N\|_F^2 + \gamma\|N\|_0, \text{ s.t. } \|S\|_{2,0} \le \tilde{Q}, \qquad (10)$$

wherein $\gamma > 0$ and represents penalty parameter used to control a sparsity of N. In the present disclosure, $\gamma=1.9$ to detect quantization error from fitting error more accurately.

Step S30. Replacing a first objective function in the optimal objective function with a second objective function to obtain a new optimal objective function, the second objective function is a lower semi-continuous function.

The first objective function is a sign ( ) function, and the second objective function is a tanh( ) function. Because the sign( ) function is not a lower semi-continuous function, problem (10) becomes difficult to solve. However, the tanh( ) function is a lower semi-continuous function. Therefore, the tanh( ) function is proposed to replace the sign( ) function. In equation (10), sgn( ) is the mathematical representation of sign( ).

Replacing the sign( ) function in the optimal objective function with the tanh( ) function, and transforming the optimization problem of the equation (10) into:

$$\min_{S,N} \|Y - \tanh(c * A(\theta)S) - N\|_F^2 + \gamma \|N\|_0, \text{ s.t. } \|S\|_{2,0} \le \tilde{Q}, \quad (11)$$

wherein c is a constant used to control an approximation degree between the tanh( ) function and the sign( ) function, and $c > 0$. In the present disclosure, $c=50$ to ensure the tanh( ) function can better approximate the sign( ) function.

Step S40. Adopting, according to the new optimal objective function, a proximal alternating minimization method and a gradient descent method to solve the optimization problem and obtain an incident angle of a target echo signal.

The optimization problem of the equation (11) involves two variables to be optimized, so the proximal alternating minimization method is adopted to solve the optimization problem. The proximal alternating minimization method includes the following two key steps:

$$S^{k+1} = \arg\min_{S,\|S\|_{2,0} \le S} f(S, N^k) = \quad (12)$$

$$\arg\min_{S,\|S\|_{2,0} \le S} \|Y - \tanh(c * A(\theta)S) - N^k\|_2^2 + \mu \|S - S^k\|_2^2,$$

$$N^{k+1} = \arg\min f(S^{k+1}, N) = \quad (13)$$

$$\arg\min_N \|Y - \tanh(c * A(\theta)S^{k+1}) - N\|_2^2 + \gamma \|N\|_0 + \mu \|N - N^k\|_2^2,$$

wherein k represents the iteration number in proximal alternating minimization, $\mu > 0$ and is a predefined proximal parameter configured to ensure the astringency of the algorithm. The last item in the equation (13) and the equation (14) is called proximal regularization. $S^k$ represents the value in the iteration process after kth iteration, and $f(S, N^k)$ represents solving S after fixing N as $N^k$.

Because (12) does not have a closed-form solution, a projected gradient descent method is adopted to process the equation (12). The iteration steps are as follows:

$$Z_p = S_p^k - \eta \nabla f(S_p^k, N^k), \quad (14)$$

$$z = [\|(Z_p)_{1,:}, \ldots, (Z_p)_{N,:}\|_2], \quad (15)$$

-continued $$(S_{p+1}^k)_{i,:} = \begin{cases} (Z_p)_{i,:}, & \text{if } i \in \vartheta, \\ 0, & \text{if } i \notin \vartheta, \end{cases} \quad (16)$$

wherein $Z_P$ is a value of $$S_p^k$$

after gradient descent once, and $$S_p^k$$

represents processing gradient descent on $S^k$ to solve $S^{k+1}$. The gradient descent is a iteration algorithm, p represents a iteration number of projected gradient descent, $\eta$ is a step size in gradient descent solving process, $Z_{i,:}$ is the i-th row of matrix Z, and z represents a vector obtained by calculating $\ell_2$-norm of each row of $Z_p$. $\upsilon$ contains coordinates of top $\tilde{Q}$ maximum value in z;

In addition, $$\nabla f(S_p^k, N^k)$$

is a gradient of $f(S, N^k)$ on $$S_p^k$$

with respect to S:

$$\nabla f(S, N^k) = \quad (17)$$

$$-2c * A^H\left(\left(\left(Y - N^k\right)^H - \tanh(c * A(\theta)S)\right) \odot \left(1 - \tanh(c * A(\theta)S)^2\right)\right) +$$

$$2\mu(S - S_p^k),$$

wherein $\odot$ represents multiplication of elements. For example, $[1,2] \odot [2,3] = [2,6]$.

It should be noted that the superscript $(\bullet)^k$ represents the iteration times in proximal alternating minimization, and the subscript $(\bullet)_p$ represents the iteration times in projected gradient descent.

For optimization problem (13), converting the complex form into real form:

$$\hat{N}^{k+1} = \arg\min_{\hat{N}} \|\hat{Y} - \tanh\left(c * \hat{A}(\theta)\hat{S}^{k+1}\right) - \hat{N}\|_2^2 + \gamma \|\hat{N}\|_0 + \mu \|\hat{N} - \hat{N}^k\|_2^2, \quad (18)$$

Wherein $\hat{Y} = [\Re(Y); \Im(Y)]$, $\hat{S}^{k+1} = [\Re(S)^{k+1}; \Im(S)^{k+1}]$, $\hat{N} = [\Re(N); \Im(N)]$, and $\hat{A}(\theta) = [\Re(A(\theta)), -\Im(A(\theta)); \Im(A(\theta)); \Re(A(\theta))]$.

Defining $\hat{E}^k = \hat{Y} - \tanh(c * \hat{A}(\theta)\hat{S}^{k+1})$ then:

$$\hat{N}^{k+1} = \arg\min_{\hat{N}} \|\hat{E}^k - \hat{N}\|_F^2 + \gamma \|\hat{N}\|_0 + \mu \|\hat{N} - \hat{N}^k\|_F^2, \quad (19)$$

In (19), $\hat{N}_{i,j}$ relies only on values of $$\hat{E}_{i,j}^k \text{ and } \hat{N}_{i,j}^k,$$

and the optimization problem (19) is solved element-by-element:

$$\hat{N}_{i,j}^{k+1} = \begin{cases} \dfrac{\hat{E}_{i,j}^k + \mu \hat{N}_{i,j}^k}{1+\mu}, & \gamma \le (\hat{E}_{i,j}^k)^2 + \mu(\hat{N}_{i,j}^k)^2 - \dfrac{\mu\left(\hat{N}_{i,j}^k - \hat{E}_{i,j}^k\right)^2}{1+\mu} \\ 0, & \gamma > (\hat{E}_{i,j}^k)^2 + \mu(\hat{N}_{i,j}^k)^2 - \dfrac{\mu\left(\hat{N}_{i,j}^k - \hat{E}_{i,j}^k\right)^2}{1+\mu} \end{cases} \quad (20)$$

After $\hat{N}^{k+1}$ is obtained, a plural form $$N^{k+1} = \hat{N}_{1:M,:}^{k+1} + j\hat{N}_{M+1:2M:}^{k+1}$$

can be further obtained.

After the iteration is completed, the incident angle of the target echo signal is obtained based on recovered S. The recovered S is a row sparse matrix. $e_2$-norm of each row is firstly calculated to obtain a sparse vector, then a distribution map of the vector (also known as energy spectrum diagram) is drawn. Seek the wave peak and the angle corresponding to the peak is the incident angle of the target echo signal.

While considering the low-noise signal-to-noise ratio environment, the quantized received signal equation (8) can better utilize the structural information of the noise, thereby obtaining better results when recovering the signal. The optimization model (10) contains the bright information of double sparse constraints and can make full use of the features of the signal to estimate the DoA of the target. The optimization model (10) is transformed into an easy-to-solve form of the equation (11), and the proximal alternating minimization and gradient descent methods are adopted to solve the problem of the equation (10).

The present disclosure solves the problem of DoA estimation based on uniform antenna arrays in the case of a large number of quantization errors (caused by low signal-to-noise ratio). First, based on the existing observation signal model, the noise matrix in the observation signal model is converted into a one-bit quantized noise matrix. Then, the distribution model of the one-bit quantized noise matrix is studied and revealed. Appropriate norms are adopted to describe the characteristics of the quantized noise matrix and the characteristics are used as a constraint or penalty term in the optimization problem. Finally, non-convex optimization theory (using $l_0$-norm to penalize sparse variables, wherein $l_0$-norm is a non-convex function. Compared with convex $l_1$-norm, $l_0$-norm can get better sparse solutions. Because $l_0$-norm is non-convex, non-convex optimization theory is needed to solve the problem) is adopted to find an iterative solution to the problem, which further improves the accuracy of one-bit quantization DoA estimation.

Existing one-bit DoA estimation research is usually conducted in high signal-to-noise ratio (i.e., weak noise) environments. However, in actual operation, low signal-to-noise ratio conditions are inevitable. Therefore, the present disclosure considers how to perform DoA estimation on target based on one-bit quantization antenna array in the presence of a large quantization error bit number caused by low signal-to-noise ratio. The present disclosure helps the radar system to be used in real low signal-to-noise ratio scenarios.

The purpose of the present disclosure is to reshape the received signal model of a one-bit radar so that the received signal can retain or reflect the distribution information of the noise data. Further, specific norm is adopted to describe the distribution of the noise, so that when using a one-bit algorithm to estimate DoA, quantization errors caused by low signal-to-noise ratio can be effectively suppressed.

The method proposed by the present disclosure is tested below. For example, a uniform linear antenna array has 20 antenna elements, and a antenna array scanning angle range is $\theta=[-90°, 90°]$, and divided with an equal interval of $0.1°$, that is L=1801. A two-component Gaussian mixture model is adopted to generate impulse noise, where the proportional component of the outliers is 10% and the variances of the two terms are 1 and 100, respectively. The signal-to-noise ratio of a satellite signal is fixed at 20 dB, and the snapshot number is 32. Then, parameters are initialized: $S^1=A^{11}\times Y$, $N^1=0$. The parameters c and $\lambda$ are set to 50 and 1.9, respectively.

As shown in FIG. 2 (mean square error versus signal-to-noise ratio in the case of two targets to be estimated), the mean square errors (MSE) between the estimated angle and the actual angle under different signal-to-noise ratio (SNR) conditions are shown. As can be seen from FIG. 2, in the high signal-to-noise ratio range ($-3$ to 9 dB), the algorithm performance of the present disclosure is better than the prior algorithms (MUSIC, CBIHT-I2, 1-bit-MUSIC, 1-bit-AND and 1-bit-OGIR in FIG. 2 are all prior algorithms). Although under the signal-to-noise ratio of $-9$ dB and $-6$ dB, the algorithm performance of the present disclosure is slightly lower than the algorithm based on infinite bit sampling, the present disclosure still shows better performance than other algorithms based on single bit sampling.

Figure 3:
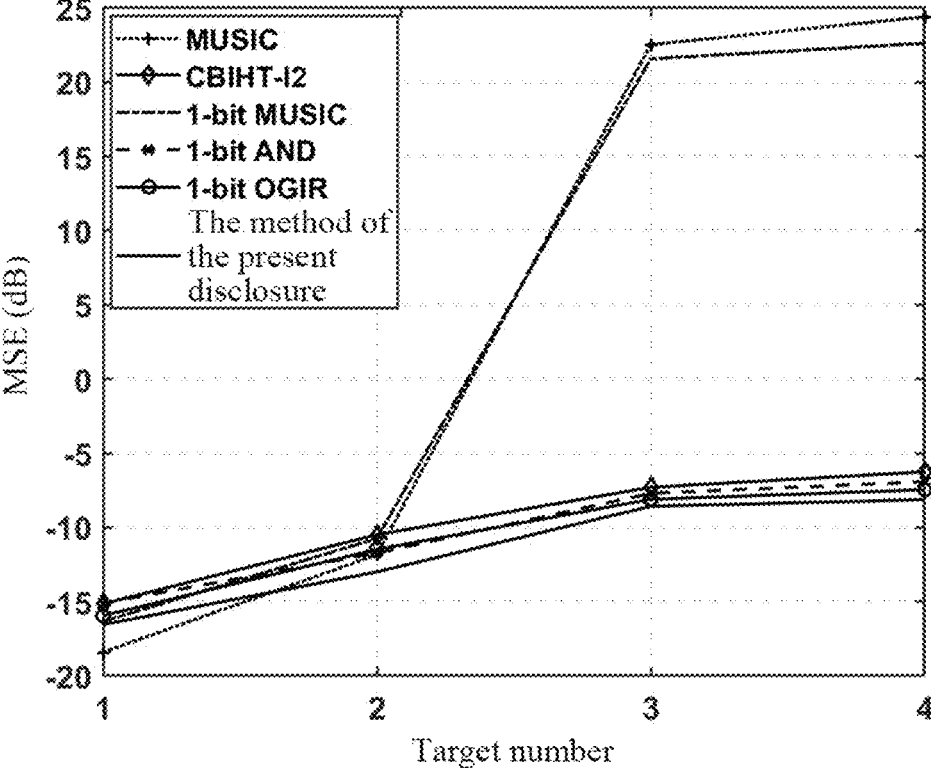
FIG. 3 is a schematic diagram of the mean square error between an estimated angle and an actual angle under different target number in an embodiment of a method for DoA estimation based on one-bit quantization antenna array according to the present disclosure.

In another aspect, as shown in FIG. 3 (mean square error versus the target number in the case of 0 dB white Gaussian noise), the mean square errors between the estimated angle and the actual angle under different target number are shown. It can be seen from FIG. 3 that when there is only one target, the algorithm performance of the present disclosure is slightly lower than the algorithm based on infinite bit sampling, but the present disclosure shows better performance than other algorithms based on one-bit sampling. While in the case of multi-targets, the algorithm performance of the present disclosure exceeds the existing algorithms (MUSIC, CBIHT-12, 1-bit-MUSIC, 1-bit-AND, and 1-bit-OGIR in FIG. 3 are all existing algorithms).

In addition, the method of the present disclosure can also be applied to detection requiring visible satellites.

Figure 4:
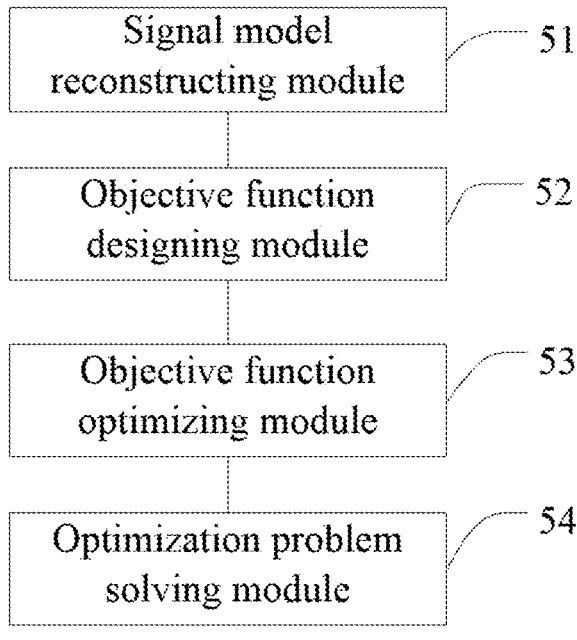
FIG. 4 is a principle schematic diagram of an embodiment of a system for DoA estimation based on one-bit quantization antenna array according to the present disclosure.

Further, as shown in FIG. 4, based on the above-mentioned DoA estimation method based on one-bit quantization antenna array, the present disclosure also provides a system for DoA estimation based on one-bit quantization antenna array. The system includes:

A signal model reconstructing module 51, configured to receive, by an antenna element, a plurality of time-discrete complex-baseband signals when a plurality of far-field and uncorrelated narrow-band signals are incident from different directions to a uniform linear array receiver, express output signals of the antenna element in vector form and received signals at different time in matrix form, quantize the received signals based on a one-bit analog-to-digital converter, and re-model the quantized received signals to obtain a new received signal model;

An objective function designing module 52, configure to select, based on the new received signal model, a noise matrix feature after norm characterization and one-bit quantization meeting a preset requirement to obtain a constraint or a penalty of an optimization problem and obtain an optimal objective function;

An objective function optimizing module 53, configured to replace a first objective function in the optimal objective function with a second objective function to obtain a new optimal objective function, the second objective function is a lower semi-continuous function;

An optimization problem solving module 54, configured to adopt, according to the new optimal objective function, a proximal alternating minimization method and a gradient descent method to solve the optimization problem and obtain an incident angle of a target echo signal.

Figure 5:
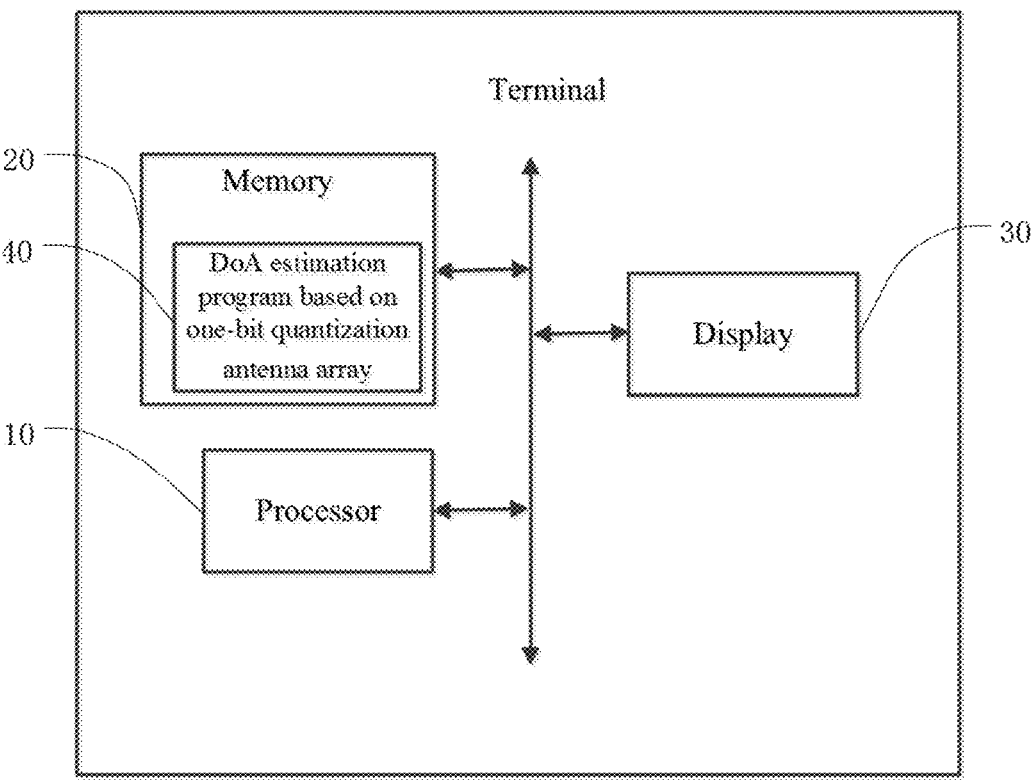
FIG. 5 is a schematic diagram of the operating environment of an embodiment of a terminal according to the present disclosure.

Furthermore, as shown in FIG. 5, based on the above-mentioned method and system for DoA estimation based on one-bit quantization antenna array, the present disclosure also provides a terminal. The terminal includes a processor 10, a memory 20 and a display 30. FIG. 5 only shows some components of the terminal, but it should be understood that implementation of all the shown components is not required, and more or less components may be implemented instead.

In some embodiments, the memory 20 may be an internal storage unit of the terminal, such as a hard disk or internal memory of the terminal. In other embodiments, the memory 20 may also be an external storage device of the terminal, such as a plug-in hard disk, a Smart Memory Card (SMC), a Secure Digital (SD) card, a Flash Card, etc. Further, the memory 20 may also include both the internal storage unit of the terminal and the external storage device. The memory 20 is used to store applications, software and various types of data, such as program codes for installing the terminal, installed on the terminal. The memory 20 can also be used to temporarily store data that has been output or is to be output. In one embodiment, the memory 20 stores a DoA estimation program based on one-bit quantization antenna array 40, and the DoA estimation program based on one-bit quantization antenna array 40 can be executed by the processor 10 to implement the DoA estimation method based on one-bit quantization antenna array in the present disclosure.

In some embodiments, the processor 10 may be a central processing unit (CPU), a microprocessor or other data processing chip, configured to run program codes or process data stored in the memory 20, such as executing the DoA estimation method based on one-bit quantization antenna array.

In some embodiments, the display 30 may be an LED display, a liquid crystal display, a touch-controlled liquid crystal display, an OLED (Organic Light-Emitting Diode) touch device, etc. The display 30 is used to display information on the terminal and to present a visual user interface. The components 10-30 of the terminal communicate with each other via a system bus.

In one embodiment, when the processor 10 executes the DoA estimation program based on one-bit quantization antenna array 40 in the memory 20, the steps of above-mentioned DoA estimation method based on one-bit quantization antenna array are implemented.

The present disclosure further provides a computer-readable storage medium. The computer-readable storage medium stores a DoA estimation program based on one-bit quantization antenna array, when the DoA estimation program based on one-bit quantization antenna array is executed by a processor, steps of the DoA estimation method based on one-bit quantization antenna array mentioned above are implemented.

To sum up, the present disclosure provides a method, and a device for DoA estimation based on one-bit quantization antenna array, the method comprises: receiving, by an antenna element, a plurality of time-discrete complex-baseband signals when a plurality of far-field and uncorrelated narrow-band signals are incident from different directions to a uniform linear array receiver, expressing output signals of the antenna element in vector form and received signals at different time in matrix form, quantizing the received signals based on a one-bit analog-to-digital converter, and re-modeling the quantized received signals to obtain a new received signal model; selecting, based on the new received signal model, a norm meeting a preset requirement to describe the characteristics of one-bit quantized noise matrix, to obtain a constraint or a penalty of an optimization problem and obtain an optimal objective function; replacing a first objective function in the optimal objective function with a second objective function to obtain a new optimal objective function, the second objective function is a lower semi-continuous function; adopting, according to the new optimal objective function, a proximal alternating minimization method and a gradient descent method to solve the optimization problem and obtain an incident angle of a target echo signal. The purpose of the present disclosure is to reshape the received signal model of the one-bit radar, enabling the received signals to preserve or reflect the distribution information of noise data. The present disclosure utilizes a specific norm to describe the distribution of noise, effectively suppressing quantization error bits generated by low signal-to-noise ratio when estimating DoA with one-bit algorithm, thereby ensuring the robustness of one-bit DoA estimation and further improving the accuracy of one-bit quantization DoA estimation in low signal-to-noise ratio environments.

It should be noted that, in this document, the terms "comprise", "include" or any other variation thereof are intended to cover non-exclusive inclusion, such that a process, method, item or terminal that comprises a series of elements are not only composed of those elements, but also can comprise other elements not expressly listed or inherent in such process, method, item or terminal. Without further limitation, a feature qualified by the statement "comprise(s) a . . . " does not exclude the presence of other identical elements in the process, method, item or terminal that comprises the element.

Of course, those skilled in the art can understand that all or part of the process in the method of the above embodiments can be implemented by instructing relevant hardware (such as processors, controllers, etc.) through computer programs. The programs can be stored in a computer-readable storage medium, when the program is executed, the program may include the process of the method in above-mentioned embodiments. The computer-readable storage medium mentioned therein can be a memory, a magnetic disk, an optical disk, etc.

It should be understood that the application of the present disclosure is not limited to the above embodiments. Those skilled in the art can make improvements or changes based on the above description. All these improvements and changes should fall within the protection scope of the appended claims of the present disclosure.

What is claimed is:

1. A direction of arrival (DoA) estimation method based on one-bit quantization antenna array, the method comprising:

receiving, by an antenna element, a plurality of time-discrete complex-baseband signals when a plurality of far-field and uncorrelated narrow-band signals are incident from different directions to a uniform linear array receiver, expressing output signals of the antenna element in vector form and received signals at different time in matrix form, quantizing the received signals based on a one-bit analog-to-digital converter, and re-modeling the quantized received signals to obtain a new received signal model;

selecting, based on the new received signal model, a noise matrix feature after norm characterization and one-bit quantization meeting a preset requirement to obtain a constraint or a penalty of an optimization problem and obtain an optimal objective function;

replacing a first objective function in the optimal objective function with a second objective function to obtain a new optimal objective function, the second objective function is a lower semi-continuous function; and adopting, according to the new optimal objective function, a proximal alternating minimization method and a gradient descent method to solve the optimization problem and obtain an incident angle of a target echo signal.

2. The method according to claim 1, wherein the uniform linear array receiver is formed of M antenna elements, a distance between the antenna elements is d, and $d \leq \lambda/2$, wherein $\lambda$ is a wavelength of an incident signal.

3. The method according to claim 2, wherein receiving, by the antenna element, the plurality of time-discrete complex-baseband signals when the plurality of far-field and uncorrelated narrow-band signals are incident from different directions to the uniform linear array receiver, expressing output signals of the antenna element in vector form and received signals at different time in matrix form, quantizing the received signals based on the one-bit analog-to-digital convertor, and re-modeling the quantized received signals to obtain a new received signal model comprises:

representing, when $\tilde{Q}$ far-field and uncorrelated narrow-band signals are incident from different directions $\tilde{\theta}=\{\theta_1, \theta_2, \ldots, \theta_{\tilde{Q}}\}$ to the uniform linear array receiver, a time-discrete complex-baseband signal received at moment n, by mth antenna element as:

$$y_m(n) = \sum_{q=1}^{\tilde{Q}} s_q(n) e^{j2\pi(m-1)\sin(\theta_q)d/\lambda} + e_m(n), \qquad (1)$$

wherein $y_m(n)$ represents a time-discrete complex-baseband signal received at n-th moment, by m-th antenna element, $s_q(n)$ represents q-th signal source, $j=\sqrt{-1}$ represents imaginary unit, $e_m(n)$ represents an additive noise, and $\theta_q$ represents a DoA angle of a real signal;

expressing the output signal of M antenna elements at the n-th moment as a vector:

$$y_n = A(\tilde{\theta})s_n + e_n, \qquad (2)$$

wherein $y_n=[y_1(n), \ldots, y_M(n)]^H \in C^M$ represents a received signal vector of length M; H represents Hermitian conjugate transpose, C represents complex domain; $s_n=[s_1(n), \ldots, s_{\tilde{Q}}(n)]^H \in C^{\tilde{Q}}$ represents a signal source vector of length $\tilde{Q}$; $s_{\tilde{Q}}(n)$ represents a $\tilde{Q}$th signal source;

$e_n=[e_1(n), \ldots, e_M(n)]^H \in C^M$ represents a noise vector of length M; $e_M(n)$ represents the additive noise; $A(\tilde{\theta})$ is an array manifold matrix, expressed as:

$$A(\tilde{\theta}) = [a(\theta_1); \ldots ; a(\theta_{\tilde{Q}})], \qquad (3)$$

wherein $\theta_q$ represents the DoA angle of the real signal, $a(\theta_q)$ is a steering vector of array, expressed as:

$$a(\theta_q) = [1, e^{j2\pi \sin(\theta_q)d/\lambda}, \ldots, e^{j2\pi(M-1) \sin(\theta_q)d/\lambda}]^H, \qquad (4)$$

expressing the received signals in matrix form when a snapshot number is N:

$$\tilde{Y} = A(\tilde{\theta})\tilde{S} + E, \qquad (5)$$

wherein $\tilde{Y} \in C^{M \times N}$ is a receiving matrix signal with dimension T×N, $\tilde{S}=[s_1, \ldots, s_N] \in C^{\tilde{Q} \times N}$ is a matrix with dimension Q×N, $E=[e_1, \ldots, e_N] \in C^{M \times N}$ is a matrix with dimension M×N, E represents a noise matrix;

expressing a quantized signal of the one-bit analog-to-digital converter as:

$$Y = c\mathrm{sgn}(A(\tilde{\theta})\tilde{S} + E), \qquad (6)$$

wherein $c\mathrm{sgn}(\bullet)=c\mathrm{sgn}(\Re(\bullet))+jc\mathrm{sgn}(\Im(\bullet))$, $\Re(\bullet)$ represents a real part of complex number, $\Im(\bullet)$ represents an imaginary part of a complex number, $c\mathrm{sgn}()$ represents one-bit quantization function $\mathrm{sign}()$ of the complex number;

when $\theta=\{\theta_1, \theta_2, \ldots, \theta_Q\}$ is a complete vector, $\theta >> \tilde{\theta}$, wherein Q elements are uniformly sampled values from $$-\frac{\pi}{2} \text{ to } \frac{\pi}{2},$$

defining a signal matrix based on $\theta$ as: $S=C^{Q \times N}$;

replacing the $\tilde{\theta}$ and $\tilde{S}$ in equation (6) with $\theta$ and S, respectively, to obtain equation as:

$$Y = c\mathrm{sgn}(A(\theta)S + E), \qquad (7)$$

wherein S is a row sparse matrix having a sparsity of $\tilde{Q}$; remodeling the quantized signal (7) to obtain the new received signal model:

$$Y = c\mathrm{sgn}(A(\theta)S) + N, \qquad (8)$$

wherein N is a quantized noise matrix having element value selected from $n_{i,j} \in \{-2, 0, 2\}+j\{-2, 0, 2\}$.

4. The method according to claim 3, wherein selecting, based on the new received signal model, the noise matrix feature after norm characterization and one-bit quantization meeting the preset requirement to obtain the constraint or the penalty of the optimization problem, and obtain the optimal objective function comprises:

applying $\ell$ -norm constraint to N to ensure sparse characteristics, applying $\ell$ -norm constraint to S to ensure sparse characteristics, and expressing the optimal objective function as:

$$\min_{S,n}\|Y - c\operatorname{sgn}(A(\theta)S)\|_F^2, \text{ s.t. } \|S\|_{2,0} \leq \tilde{Q}, \|N\|_0 \leq \rho, \tag{9}$$

wherein $\tilde{Q}$ and $\rho$ are a target number and a quantization error bit number, respectively; transforming the optimization problem of the equation (9) into an optimization problem with penalty term, and obtain the optimal objective function:

$$\min_{S,n}\|Y - \operatorname{sgn}(A(\theta)S) - N\|_F^2 + \gamma\|N\|_0, \text{ s.t. } \|S\|_{2,0} \leq \tilde{Q}, \tag{10}$$

wherein $\gamma > 0$ and represents penalty parameter used to control a sparsity of N.

5. The method according to claim 4, wherein the first objective function is a sign( ) function, and the second objective function is a tanh( ) function;

replacing the first objective function in the optimal objective function with the second objective function to obtain the new optimal objective function, the second objective function is the lower semi-continuous function comprises:

replacing the sign( ) function in the optimal objective function with the tanh( ) function, and transforming the optimization problem of the equation (10) into:

$$\min_{S,n}\|Y - \tanh(c * A(\theta)S) - N\|_F^2, + \gamma\|N\|_0, \text{ s.t. } \|S\|_{2,0} \leq \tilde{Q}, \tag{11}$$

wherein c is a constant used to control an approximation degree between the tanh( ) function and the sign( ) function, and $c>0$.

6. The method according to claim 5, wherein adopting, according to the new optimal objective function, the proximal alternating minimization method and the gradient decent method to solve the optimization problem and obtain the incident angle of the target echo signal comprises:

selecting the proximal alternating minimization method to solve the optimization problem, wherein the proximal alternating minimization method comprises:

$$S^{k+1} = \arg\min_{S,\|S\|_{2,0}\leq S} f(S, N^k) \tag{12}$$

$$= \arg\min_{S,\|S\|_{2,0}\leq S}\|Y - \tanh(c * A(\theta)S) - N^k\|_2^2 + \mu\|S - S^k\|_2^2,$$

$$N^{k+1} = \arg\min_N f(S^{k+1}, N) \tag{13}$$

$$= \arg\min_N\|Y - \tanh(c * A(\theta)S^{k+1}) - N\|_2^2 + \gamma\|N\|_0 + \mu\|N - N^k\|_2^2,$$

wherein k represents an iteration number in proximal alternating minimization, $\mu>0$ and is a predefined proximal parameter;

selecting a projected gradient descent method to process equation (12), wherein comprises iteration steps of:

$$Z_p = S_p^k - \eta\nabla f(S_p^k, N^k), \tag{14}$$

$$z = [\|(Z_p)_{1,:}\|, \dots, (Z_p)_{N,:}\|_2], \tag{15}$$

$$(S_{p+1}^k)_{i,:} = \begin{cases} (Z_p)_{i,:}, & \text{if } i \in \vartheta \\ 0, & \text{if } i \notin \vartheta, \end{cases} \tag{16}$$

wherein $Z_p$ is a value of $$S_p^k$$

after gradient descent once, p represents an iteration number of projected gradient descent, $\eta$ is a step size in gradient descent solving process, $Z_{i,:}$ is the ith row of matrix Z; $\upsilon$ contains coordinates of top $\tilde{Q}$ maximum value in z;

$$\nabla f(S_p^k, N^k)$$

is a gradient of $f(S, N^k)$ on $$S_p^k$$

with respect to S:

$$\nabla f(S, N^k) = \tag{17}$$

$$-2c * A^H(((Y - N^k)^H - \tanh(c * A(\theta)S)) \odot (1 - \tanh(c * A(\theta)S)^2)) + 2\mu(S - S_p^k),$$

wherein $\odot$ represents multiplication of elements;

for optimization problem of the equation (13), converting the complex form into real form:

$$\hat{N}^{k+1} = \arg\min_{\hat{N}} \|\hat{Y} - \tanh(c * \hat{A}(\theta)\hat{S}^{k+1}) - \hat{N}\|_2^2 + \gamma\|\hat{N}\|_0 + \mu\|\hat{N} - \hat{N}^k\|_2^2, \tag{18}$$

wherein $\hat{Y} = \Re(Y); \Im(Y)]$, $\hat{S}^{k+1} = [\Re(S)^{k+1}; \Im(S)^{k+1}]$, $\hat{N} = \Re(N); \Im(N)]$, and $\hat{A}(\theta) = [\Re(A(\theta)) - \Im(A(\theta)); \Im(A(\theta)); \Re(\theta))]$;

defining $\hat{E}^k = \hat{Y} - \tanh(c * \hat{A}(\theta)\hat{S}^{k+1})$, then:

$$\hat{N}^{k+1} = \arg\min_{\hat{N}} \|\hat{E}^k - \hat{N}\|_F^2 + \gamma\|\hat{N}\|_0 + \mu\|\hat{N} - \hat{N}^k\|_F^2, \tag{19}$$

in the equation (19), $\hat{N}_{i,j}$ relies only on values of $$\hat{E}_{i,j}^k \text{ and } \hat{N}_{i,j}^k,$$

and solving the optimization problem of the equation (19) element-by-element:

$$\hat{N}_{i,j}^{k+1} = \begin{cases} \dfrac{\hat{E}_{i,j}^k + \mu \hat{N}_{i,j}^k}{1+\mu}, & \gamma \le (\hat{E}_{i,j}^k)^2 + \mu(\hat{N}_{i,j}^k)^2 - \dfrac{\mu\left(\hat{N}_{i,j}^k - \hat{E}_{i,j}^k\right)^2}{1+\mu} \\[4mm] 0, & \gamma > (\hat{E}_{i,j}^k)^2 + \mu(\hat{N}_{i,j}^k)^2 - \dfrac{\mu\left(\hat{N}_{i,j}^k - \hat{E}_{i,j}^k\right)^2}{1+\mu} \end{cases} \tag{20}$$

obtaining a plural form $$N^{k+1} = \hat{N}_{i:M,:}^{k+1} + j\hat{N}_{M+1:2M,:}^{k+1}$$

after obtaining $$\hat{N}^{k+1};$$

obtaining the incident angle of the target echo signal based on recovered S after iteration.

7. The method according to claim 6, wherein the antenna element is a sensor.

8. A terminal, comprising: a memory, a processor, and a DoA estimation program based on one-bit quantization antenna array stored in the memory and implemented by the processor, when the program is executed by the processor, steps of the DoA estimation method based on one-bit quantization antenna array according to claim 1 are implemented.

9. A system for DoA estimation based on one-bit quantization antenna array, the system comprising:

a signal model reconstructing module configured to receive, by an antenna element, a plurality of time-discrete complex-baseband signals when a plurality of far-field and uncorrelated narrow-band signals are incident from different directions to a uniform linear array receiver, express output signals of the antenna element in vector form and received signals at different time in matrix form, quantize the received signals based on a one-bit analog-to-digital converter, and re-model the quantized received signals to obtain a new received signal model;

an objective function designing module configured to select, based on the new received signal model, a noise matrix feature after norm characterization and one-bit quantization meeting a preset requirement to obtain a constraint or a penalty of an optimization problem and obtain an optimal objective function;

an objective function optimizing module configured to replace a first objective function in the optimal objective function with a second objective function to obtain a new optimal objective function, the second objective function is a lower semi-continuous function; and an optimization problem solving module configured to adopt, according to the new optimal objective function, a proximal alternating minimization method and a gradient descent method to solve the optimization problem and obtain an incident angle of a target echo signal.

* * * * *